United States Patent
Hennessy et al.

(10) Patent No.: US 7,227,275 B2
(45) Date of Patent: Jun. 5, 2007

(54) METHOD FOR RETROFITTING WIND TURBINE FARMS

(75) Inventors: Timothy David John Hennessy, Portland, OR (US); Mark T. Kuntz, West Chicago, IL (US)

(73) Assignee: VRB Power Systems Inc., Vancouver, British Colombia (CA)

( * ) Notice: Subject to any disclaimer, the term of this patent is extended or adjusted under 35 U.S.C. 154(b) by 222 days.

(21) Appl. No.: 11/048,388

(22) Filed: Feb. 1, 2005

(65) Prior Publication Data

US 2006/0171086 A1   Aug. 3, 2006

(51) Int. Cl.
  *F03D 1/00*  (2006.01)
(52) U.S. Cl. .......................................... 290/55
(58) Field of Classification Search ............. None
  See application file for complete search history.

(56) References Cited

U.S. PATENT DOCUMENTS

| | | | |
|---|---|---|---|
| 3,530,003 A | 9/1970 | Warszawski et al. | |
| 3,996,064 A | 12/1976 | Thaller | 320/2 |
| 4,287,465 A * | 9/1981 | Godard et al. | 320/101 |
| 4,362,791 A | 12/1982 | Kaneko et al. | 429/101 |
| 4,786,567 A | 11/1988 | Skyllas-Kazacos et al. | 429/19 |
| 4,956,244 A | 9/1990 | Shimizu et al. | 429/17 |
| 5,250,158 A | 10/1993 | Kaneko et al. | 204/86 |
| 5,318,865 A | 6/1994 | Kaneko et al. | 429/193 |
| 5,368,762 A | 11/1994 | Sato et al. | 252/62.2 |
| 5,587,132 A | 12/1996 | Nakajima et al. | 423/62 |
| 5,656,390 A | 8/1997 | Kageyama et al. | 429/44 |
| 5,665,212 A | 9/1997 | Zhong et al. | 304/297 R |
| 5,759,711 A | 6/1998 | Miyabayashi et al. | 429/15 |
| 5,851,694 A | 12/1998 | Miyabayashi et al. | 429/105 |
| 6,143,443 A | 11/2000 | Kazacos et al. | 429/204 |
| 6,461,772 B1 | 10/2002 | Miyake et al. | 429/247 |
| 6,468,688 B2 | 10/2002 | Kazacos et al. | 429/101 |
| 6,562,514 B1 | 5/2003 | Kazacos et al. | 429/204 |
| 6,563,234 B2 * | 5/2003 | Hasegawa et al. | 307/66 |
| 6,613,298 B2 | 9/2003 | Tanaka et al. | 423/62 |
| 6,670,721 B2 * | 12/2003 | Lof et al. | 290/44 |
| 6,680,547 B1 * | 1/2004 | Dailey | 307/31 |
| 6,761,945 B1 | 7/2004 | Adachi et al. | 428/36.1 |
| 6,764,789 B1 | 7/2004 | Sekiguchi et al. | 429/105 |
| 6,858,953 B2 * | 2/2005 | Stahlkopf | 290/44 |
| 2004/0036360 A1 * | 2/2004 | McCombs | 307/46 |

(Continued)

FOREIGN PATENT DOCUMENTS

EP    246649 A1 * 11/1987

(Continued)

OTHER PUBLICATIONS

Bartolozzi, M., "Development of Redox Flow Batteries. A Historical Bibliography," Journal of Power Sources, 27 (1989), pp. 219-234.

(Continued)

*Primary Examiner*—Joseph Waks
(74) *Attorney, Agent, or Firm*—John R. Thompson; Stoel Rives LLP

(57) ABSTRACT

A power generation system with a predetermined rating limit includes one or more wind turbine generators and a vanadium redox battery. The vanadium redox battery absorbs excess energy to ensure that the rating limit is not exceeded, provide system stability, and improve power generation availability. The power generation system may further include a control system to manage the vanadium redox battery's absorption and power generation to control system stability and system frequency.

23 Claims, 3 Drawing Sheets

U.S. PATENT DOCUMENTS

| | | | |
|---|---|---|---|
| 2004/0191623 A1 | 9/2004 | Kubata et al. | 429/189 |
| 2005/0156432 A1* | 7/2005 | Hennessy | 290/44 |
| 2006/0142899 A1* | 6/2006 | Wobben | 700/286 |
| 2006/0171086 A1* | 8/2006 | Hennessey et al. | 361/62 |
| 2006/0273595 A1* | 12/2006 | Avagliano et al. | 290/44 |
| 2007/0001461 A1* | 1/2007 | Hopewell | 290/44 |
| 2007/0035135 A1* | 2/2007 | Yoshida | 290/44 |

FOREIGN PATENT DOCUMENTS

| | | |
|---|---|---|
| EP | 889571 A2 * | 1/1999 |
| EP | 1 536 506 A1 | 6/2005 |
| EP | 1536506 A1 * | 6/2005 |
| JP | 08019179 A * | 1/1996 |
| JP | 11299106 A * | 10/1999 |
| WO | WO 95/12219 | 5/1995 |
| WO | WO 9950945 A1 * | 10/1999 |
| WO | WO 03/092109 A1 | 11/2003 |

OTHER PUBLICATIONS

Sum, et al., "A Study of the V(II)/V(III) Redox Couple for Redox Flow Cell Applications," Journal of Power Sources, 15 (1985), pp. 179-190.

Skyllas-Kazacos et al., "Characteristics and performance of 1 kW UNSW vanadium redox battery," Journal of Power Sources, 35 (1991) pp. 399-404.

Skyllas-Kazacos, et al., "Vanadium redox battery prototype: design & development," University of New South Wales, Department of Minerals and Energy, Jan. 1991, 254 pgs.

Kazacos, Michael, "Electrolyte Optimization and Electrode Material Evaluation for the Vanadium Redox Battery," a thesis submitted as part of the requirements for the degree of Master of Science, School of Chemical Engineering and Industrial Chemistry, The University of New South Wales, Feb. 1989, 250 pgs.

Skyllas-Kazacos, et al., "Development of Redox Cell for Remote Area Energy Storage," School of Chemical Engineering & Industrial Chemistry, University of New South Wales, 200 pgs.

* cited by examiner

METHOD FOR RETROFITTING WIND TURBINE FARMS

TECHNICAL FIELD

This invention relates to power generators and battery storage systems, and more specifically, to wind turbines and vanadium redox battery systems.

BACKGROUND OF THE INVENTION

Wind generation systems have received much interest as an alternative to fossil fuels plants. Wind generation systems have the disadvantage of providing fluctuating or intermittent power output due to the variability of wind speed. Additionally, there is a finite ramp up and ramp down (decay) function from individual wind turbines when wind speeds change. The decay function is generally of the order of several minutes. Models of short term fluctuations are well advanced, and variations can be predicted with high levels of confidence. Combining such models with physical turbine inertias, the power outputs from wind turbine farms is predictable and can be included in power system planning as a dispatchable resource.

There remains a limit to how much capacity credit can be given to a wind farm or individual wind turbine. This is particularly true where the wind regimen is not coincident with load demand. For example, in certain wind turbine farm locations, wind speeds are greatest when the system demand is lowest. Prices for wind energy and capacity will always, therefore, be discounted at a short run avoided cost rate unless there is very high confidence that load demand and wind turbine output overlap.

A solution to variable output from wind turbines is to provide storage for the excess energy. The energy may then be delivered to a grid when the wind turbine output drops off. From the supply side perspective, this is an availability enhancement tool to provide a spinning reserve and a firm source of supply. From the demand side perspective, the storage is a load shaping or leveling tool. New electrical storage technologies are able to provide fast response to load fluctuations and large scale shifting of energy from off-peak or low value time periods to peak periods.

Integrating an energy storage system and a wind based generator in either a single wind turbine form or in a group of turbines involves the selection of a capacity and storage duration which allows the output to be firmed up in an optimal fashion. If the cost of this energy storage system is such that the added benefits resulting from its installation including increased energy sales (less spillage), increased capacity payments, and ancillary service benefits amount to more than its operating and repayment costs, then the energy storage system becomes a viable option. In addition, the energy storage system improves the penetration levels of wind power generation and improves system parameters, such as power quality, voltage control, and overall load factor. By applying energy storage at distribution levels, localized benefits as well as summated transmission system benefits occur.

Thus, it would be an advancement in the art to provide a stable and constant power output from one or more wind turbine generators by employing the benefits of an energy storage system.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF PREFERRED EMBODIMENTS

Figure 2:
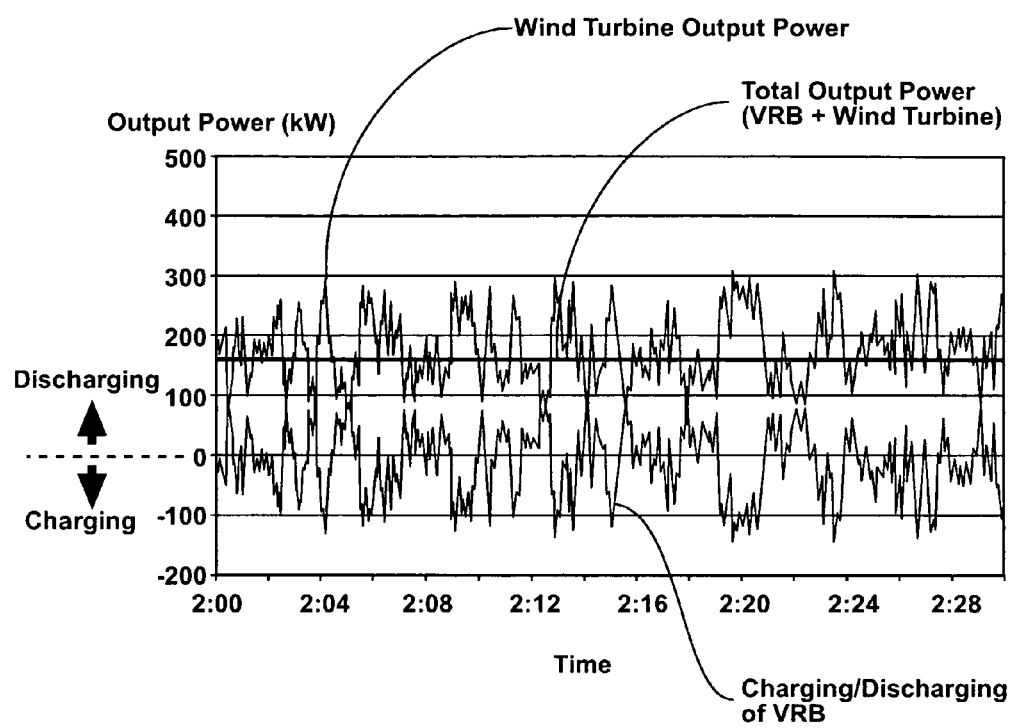
FIG. 2 is a graph of a wind turbine and vanadium redox battery system performance.
Figure 3:
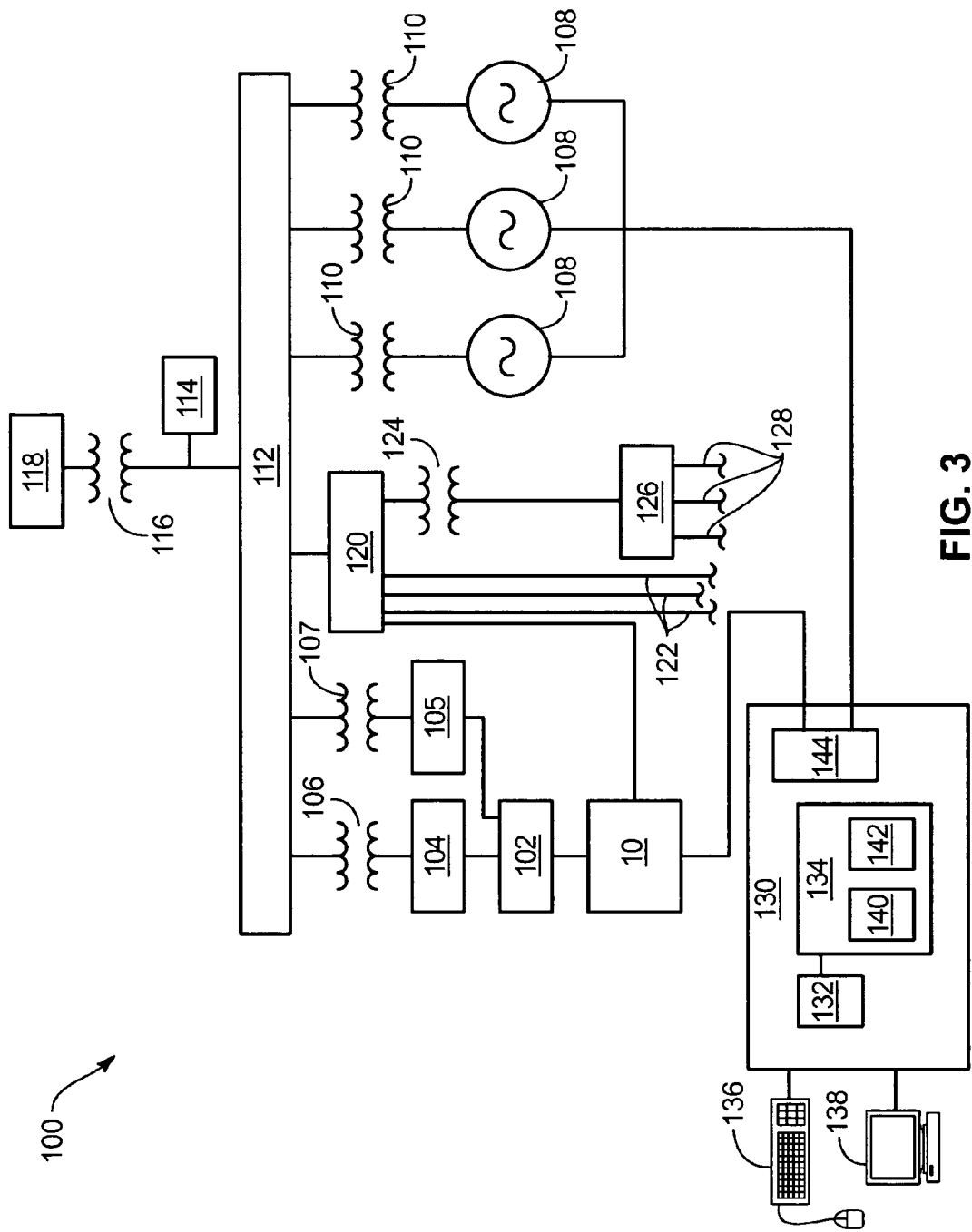
FIG. 3 is a block diagram of an embodiment of a wind turbine power generation system.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of presently preferred embodiments of the invention.

A vanadium redox battery (VRB) is used in conjunction with one or more wind turbine generators to reduce variability in a total system power output. A VRB can increase power availability and enhance the value and price that can be charged for wind energy. A VRB provides power output to support machine generators and receives excess power to enable charging. A VRB has a unique 1 to 1 charge-discharge response allowing the VRB to absorb energy from wind gusts and thus smooth out the wind power supply. This allows "spillage" of wind energy in wind turbine generators to be reduced to zero and simplifies the control of the blade pitch angles and yaw control of the wind turbine generator and allows the turbine generator to continuously operate at maximum speed.

Figure 1:
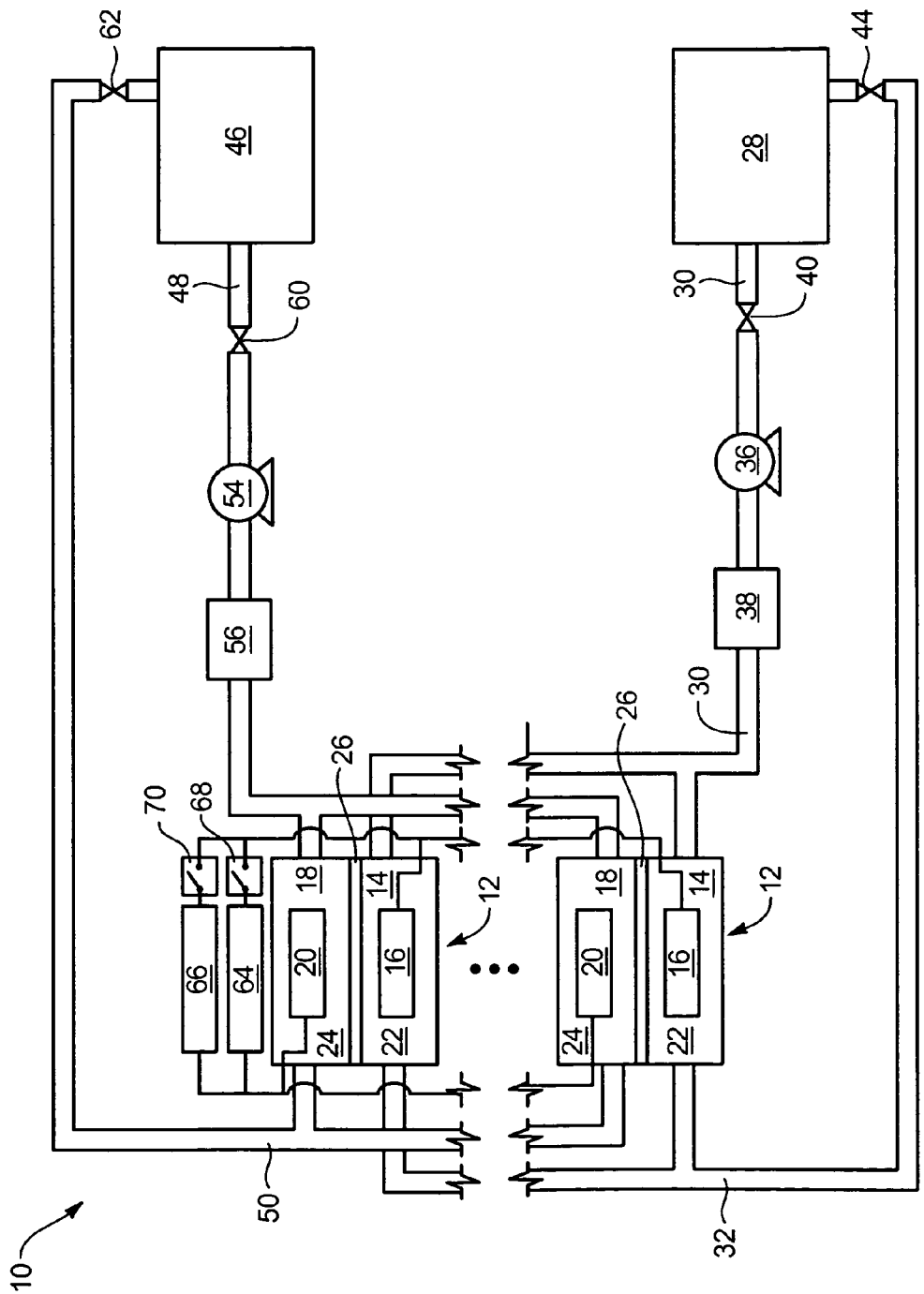
FIG. 1 is a block diagram of an embodiment of a vanadium redox battery energy storage system.

Referring to FIG. 1, a block diagram of a VRB-ESS 10 for use with the present invention is shown. A suitable energy storage system is required for remote power system applications that are supplied by either photovoltaic arrays or wind turbine generators. For such applications, low life-cycle cost and simplicity of operation are major requirements.

The system 10 includes one or more cells 12 that each have a negative compartment 14 with a negative electrode 16 and a positive compartment 18 with a positive electrode 20. Suitable electrodes include any number of components known in the art and may include electrodes manufactured in accordance with the teachings of U.S. Pat. No. 5,665,212, which is hereby incorporated by reference. The negative compartment 14 includes an anolyte solution 22 in electrical communication with the negative electrode 16. The anolyte solution 22 is an electrolyte containing specified redox ions which are in a reduced state and are to be oxidized during the discharge process of a cell 12, or are in an oxidized state and are to be reduced during the charging process of a cell 12, or which are a mixture of these latter reduced ions and ions to be reduced. The positive compartment 18 contains a catholyte solution 24 in electrical communication with the positive electrode 20. The catholyte solution 24 is an electrolyte containing specified redox ions which are in an oxidized state and are to be reduced during the discharge process of a cell 12, or are in a reduced state and are to be oxidized during the charging process of the cell 12, or which are a mixture of these oxidized ions and ions to be oxidized.

The anolyte and catholyte solutions 22, 24 may be prepared in accordance with the teachings of U.S. Pat. Nos. 4,786,567, 6,143,443, 6,468,688, and 6,562,514, which are hereby incorporated by reference, or by other techniques well known in the art. The anolyte solution 22 refers to an electrolyte containing specified redox ions which are in a reduced state and are to be oxidized during the discharge process of a redox battery, or are in an oxidized state and are to be reduced during the charging process of a redox battery, or which are a mixture of these latter reduced ions and ions to be reduced. The catholyte solution 24 refers to an electrolyte containing specified redox ions which are in an oxidized state and are to be reduced during the discharge process of a redox battery, or are in a reduced state and are to be oxidized during the charging process of the redox battery, or which are a mixture of these oxidized ions and ions to be oxidized. Further, aqueous NaOH is not included within the scope of anolyte solution 22, and aqueous HCl is not included within the scope of a catholyte solution 24. In one embodiment, the anolyte solution 22 is 1M to 6M $H_2SO_4$ and includes a stabilizing agent in an amount typically in the range of from 0.1 to 20 wt %, and the catholyte solution 24 is 1M to 6M $H_2SO_4$.

Each cell 12 includes an ionically conducting separator 26 disposed between the positive and negative compartments 14, 18 and in contact with the catholyte and anolyte solutions 22, 24 to provide ionic communication therebetween. The separator 26 serves as a proton exchange membrane and may include a carbon material which may or may not be purflomatorated.

Additional anolyte solution 22 is held in an anolyte reservoir 28 that is in fluid communication with the negative compartment 14 through an anolyte supply line 30 and an anolyte return line 32. The anolyte reservoir 28 may be embodied as a tank, bladder, or other container known in the art. The anolyte supply line 30 communicates with a pump 36 and a heat exchanger 38. The pump 36 enables fluid movement of the anolyte solution 22 through the anolyte reservoir 28, supply line 30, negative compartment 14, and return line 32. The pump 36 has a variable speed to allow variance in the generated flow rate. The heat exchanger 38 transfers generated heat from the anolyte solution 22 to a fluid or gas medium. The pump 36 and heat exchanger 38 may be selected from any number of known, suitable devices.

The supply line 30 includes one or more supply line valves 40 to control the volumetric flow of anolyte solution. The return line 32 communicates with a return line valves 44 that controls the return volumetric flow.

Similarly, additional catholyte solution 24 is held in a catholyte reservoir 46 that is in fluid communication with the positive compartment 18 through a catholyte supply line 48 and a catholyte return line 50. The catholyte supply line 48 communicates with a pump 54 and a heat exchanger 56. A variable speed pump 54 enables flow of the catholyte solution 24 through the catholyte reservoir 46, supply line 48, positive compartment 18, and return line 50. The supply line 48 includes a supply line valve 60, and the return line 50 includes a return line valve 62.

The negative and positive electrodes 16, 20 are in electrical communication with a power source 64 and a load 66. A power source switch 68 is disposed in series between the power source 64 and each negative electrode 16. Likewise, a load switch 70 is disposed in series between the load 66 and each negative electrode 16. One of skill in the art will appreciate that alternative circuit layouts are possible, and the embodiment of FIG. 1 is provided for illustrative purposes only.

In charging, the power source switch 68 is closed, and the load switch is opened. Pump 36 pumps the anolyte solution 22 through the negative compartment 14, and anolyte reservoir 28 via anolyte supply and return lines 30, 32. Simultaneously, pump 54 pumps the catholyte solution 24 through the positive compartment 18 and catholyte reservoir 46 via catholyte supply and return lines 48, 50. Each cell 12 is charged by delivering electrical energy from the power source 64 to negative and positive electrodes 16, 20. The electrical energy derives divalent vanadium ions in the anolyte solution 22 and quinvalent vanadium ions in the catholyte solution 24.

Electricity is drawn from each cell 12 by closing load switch 70 and opening power source switch 68. This causes load 66, which is in electrical communication with negative and positive electrodes 16, 20 to withdraw electrical energy. Although not illustrated, a power conversion system may be incorporated to convert DC power to AC power as needed.

A number of control parameters influence the efficiency of the system 10. A key control parameter is the temperature of the anolyte and catholyte solutions 22, 24. The temperature is influenced by ambient conditions and load requirements. Another control parameter is the pressure of the solutions 22, 24 which is influenced by flow rates, state of charge (SOC), temperature, and plant design. A further control parameter is the flow rate which is controlled through variable speed drives. Other control parameters include charging current and duration of constant current periods, as determined by SOC.

Another control parameter is hydrogen evolution. The hydrogen evolution is minimized in the control strategy and is influenced by temperature, SOC, load and rates of charge and discharge, which are ramp rates. Another control parameter is the remixing of concentrations of the anolyte and catholyte solutions 22, 24 with respect to volumes. Pressure differentials develop over time as reservoirs 28, 46 have different electrolyte levels due to crossover. Concentrations also vary, and system optimization must factor the remixing parameter.

Recharge and discharge periods are additional control parameters. The rate of charge and discharge impact the evolution of hydrogen. In addition, during discharge, heat is developed, and the temperature of the anolyte and catholyte solutions 22, 24 is raised. Viscosity is thus affected, and pump flow rates need to be adjusted accordingly. The optimal time for charge and discharge is selected within the maximum rates that the system can handle as well as within the loads requirements, i.e., time available in a day.

Referring to FIG. 2, a graph of power output for a power system including a wind turbine and a VRB is shown. During periods of high output from the wind turbine and/or low demand, the VRB is charged. The VRB releases energy during low output from the wind turbine and/or high demand. The power system is effective in stabilizing and smoothing power output as indicated by the total output power which includes wind turbine output and VRB output.

A VRB may be coupled to an entire wind turbine farm to improve the functionality of wind generation. VRBs are scalable to accommodate energy storage and release for any number of wind turbines.

The present invention contemplates the use of energy storage with respect to wind turbine farms. Several thousands of wind turbines installed in two to three decades ago are nearing the end of their productive life spans. Additionally, advances in the design of modern wind turbines in the areas of efficiency, reliability, and sensitivity to avian habitat make the replacement and repowering of many wind turbines an attractive option. Introducing a VRB for energy storage provides the benefits of stabilizing output, shifting wind energy to peak periods, and improving overall power quality. Furthermore, although wind turbines may be ending their useful life, transformers and other equipment in a wind turbine farm may have a significant amount of useful life remaining.

A VRB also enables a significant throughput increase for the existing interconnect and grid infrastructure. Rather than retrofitting an existing facility to the current rating limit of the interconnect, the wind turbine farm can be oversized by a factor equivalent to the size of the VRB. The rating limit is typically established by a connection agreement between a supervising entity of the wind turbine farm and a supervising entity of a grid infrastructure. The rating limit is a contractual obligation of the amount of energy that will be accepted at any given time. The rating limit may also be a physical restraint based on how much an interconnect can accept. Previously, when a rating limit was exceeded, the excess energy was lost. A VRB allows energy storage so that when wind turbine output exceeds the rating limit, excess energy may be stored. The stored energy may then be discharged during low wind and/or high demand periods and still remain under the rating limit. The VRB allows a wind turbine farm to provide an average power output that approaches the rating limit without exceeding the limit.

The average power output is determined through the calculation of a capacity factor which is a function of blade heights and wind velocities over time. By way of example, a wind turbine farm has a peak output defined and limited by a power purchase agreement. In this example, the rating limit is at 20 MW. The wind turbine farm may operate in California with a capacity factor less than 40%. Accordingly, an average output of 40%×20 MW=8 MW is generated across the year with 20MW of wind turbines installed. If more than 20 MW of turbines are installed there is a possibility based on defined probabilities of the output exceeding the rated maximum which would be penalized or could cause damage. The wind turbines would be controlled to "spill" or waste any peaks over the 20 MW. This would reduce the return on investment and discourage such installation. By using a VRB and the techniques described herein, instead of spilling the excess peak wind the energy is stored for later dispatch. The average or capacity factor is increased so more energy is delivered as well as being delivered at the correct time.

Referring to FIG. 3, a block diagram of an embodiment of a power generation system or wind turbine farm 100 is shown. One of skill in the art will appreciate that the system 100 is for illustrative purposes only, and other configurations, implementations, and techniques are within the scope of the invention. The system 100 may be retrofitted to include a VRB 10. The VRB 10 provides DC to a coupling circuit 102 and an inverter 104 to convert DC to AC. A rectifier 105 converts received AC power to DC for storage in the VRB 10. The inverter 104 couples to a step up transformer 106 to increase the voltage. The rectifier 105 may couple to a step down transformer 107 to decrease voltage.

The system 100 includes one or more wind turbine generators 108 that are each in communication with a respective step up transformer 110. The wind turbine generators 108 may be selected from any number of commercially available devices. A wind turbine generator 108 may have a vertical or horizontal axis and may be an induction type or synchronous machine generator. The wind turbine generators 108 may generate AC, as illustrated herein, or DC. DC wind turbine generators provide the advantages of being lighter in weight and less expensive to maintain. The wind turbine generators 108 may be rated to collectively exceed a predetermined rating limit for the system 100. The VRB 10 is sized appropriately to receive and store the excess power.

Each step up transformer 106, 110 is in electrical communication with a main switchboard 112 for local power distribution. The main switchboard 112 is in electrical communication with relays 114 for metering and protection, a step up transformer 116 to increase the voltage for remote distribution, and a distribution feeder 118 to enable long range power transmission. A panel board 120 may be coupled to the main switchboard 112 for local power distribution. The panel board 120 may be in electrical communication with the VRB 10 to power pumps 36, 54. One or more power lines 122 are in communication with the panel board 120 to provide high voltage supply to one or more applications, such as lighting, HVAC, and so forth. A transformer 124, in electrical communication with the panel board 120, steps down the voltage for wall outlets and delivers the voltage to a sub panel 126. The sub panel 126 is in electrical communication with one more wall outlets 128.

The power generation system 100 may further include a control system 130 that interfaces with the VRB 10 and wind turbine generators 108 to control their respective operation. The control system 130 manages the performance of the VRB 10 in such a manner as to optimally meet the fundamental parameters of efficiency and safe operation. The control system 130 may further provide self protection in the event of an external or internal fault or failure of a critical component, accurate controlled output as determined by dynamic load requirements or preset performance thresholds, and ambient conditions prevailing from time to time in each cycle.

The control system 130 monitors the power output of the VRB 10, generators 108, and overall power generation system 100. The control system 130 ensures that total power is equal to or less than the rating limit. The control system 130 optimizes energy storage and energy release to thereby approach the rating limit without exceeding the rating limit. In this manner, the average total power output is maximized which increases profitability of the system 100.

The control system 130 further monitors the charging and discharging times of the VRB 10. There are several key parameters which control the operation of a VRB 10. For any given concentration of electrolyte solution, the key parameters include temperature, volumetric flow rates, pressure within and across the cells 12, and state of charge of the electrolyte and load as evidenced by the current drawn or supplied. A load may be seen as positive or negative. If negative, then the load is actually supplying power to the VRB 10. This is done by the generators 108 supplying energy to the VRB 10. The generators 108 may generate AC, which is converted to DC and stored within the VRB 10, or may generate DC which is stored without conversion in the VRB 10. All of these parameters continuously change in a dynamic manner and vary with the age of the VRB 10.

The control system 130 may operate the VRB 10 in an automatic mode to ensure that the highest possible efficiency is achieved as measured from the alternating current input to alternating current output on a round trip basis. During operation, the control system 130 may adjust the charging and discharging, pump flow rates, and associated pressures as dynamic changes in VRB components occurs.

The control system 130 may be embodied as a programmable logic computer with a processor 132, micro-controller, or the like for executing applications in accordance with the present invention. The processor 132 is in electrical communication with a memory 134 that receives and stores executable applications and data. The memory 134 may be embodied in various ways and may collectively include different memory devices, such as ROM, RAM, EPROM, flash memory, and non-volatile memory, such as a magnetic hard drive, and the like. The control system 130 further includes an input 136 and an output 138 to enable user interaction.

The control system 130 includes a control module 140, resident in memory 134 that monitors and controls the power generation system 100. The control module 140 is an algorithmic application that evaluates the dynamic conditions of the system 100 by monitoring operational data 142 indicative of the system states to enhance performance. The control module 140 may include a predictive algorithm that, based on historic or forecasted trends, ensures that adequate energy storage capacity is available to accommodate an expected period of energy overproduction. If adequate energy storage capacity is not available, the control module 140 initiates a full or partial discharge in advance of the overproduction period.

The control system 130 includes a communication interface 144 to communicate with the VRB 10 and wind turbine generators 108. The communication interface 144 may incorporate any number of conventional protocols known in the art.

The control system 130 manages the interaction of the wind turbine generators 108 and VRB 10 to ensure stability and promote efficiency. The control system 130 determines when an overexcited condition exists for the wind turbine generators 108 and instructs the VRB 10 to absorb excess power available from the wind turbines 108 and charge the cells 12. Similarly, the control system 130 determines when an underexcited condition exists for the wind turbine generators 108 and draws active power from the VRB 10. The power generation system 100 provides a constant voltage in an on-grid application. The control system 130 continuously monitors the power output of the wind turbine generators 108. The power output from the VRB 10 is increased or decreased accordingly to provide a constant voltage.

In the power generation system 100, the VRB 10 acts as a shock absorber by supplying a stabilizing factor where dynamic load changes occur or where wind turbine generation supply varies. Load changes can result in an increase or decrease in torque angle. This can lead to oscillations in speed and to frequency and to system instability. The exact mechanical versus electrical relationships to ensure a balance, is determined by a "swing equation" for each system of generators. The control system 130 prevents this from occurring by instructing the VRB 10 to supply energy or absorbing excess energy as required and effectively control the torque angle. By including a VRB 10, the system can be operated closer to its stability limits and more efficiently.

The present invention applies VRB energy storage capability to wind generation to improve energy availability, increase the amount of wind generation that may be installed on a grid without risking system voltage stability, increase throughput of existing grid infrastructure, and to yield various ancillary benefits, such as reduced system losses and power factor control. The integrated approach of applying VRB energy storage to wind generation also yields economic returns in specialized cases, such as island systems and wind turbine farm repowering with rates of return that are commercially attractive.

It will be obvious to those having skill in the art that many changes may be made to the details of the above-described embodiments without departing from the underlying principles of the invention. The scope of the present invention should, therefore, be determined only by the following claims.

The invention claimed is:

1. A method for retrofitting a wind power generation system that includes wind turbine generators and a rating limit for grid interconnection, comprising:
   replacing the wind turbine generators having an original collective energy output that is within the rating limit with replacement wind turbine generators having an increased collective energy output, wherein the increased collective energy output exceeds the rating limit; and
   placing a vanadium redox battery in electrical communication with the replacement wind turbine generators, the vanadium redox battery sized to absorb and store the difference between the increased collective energy output and the original collective energy.

2. The method of claim 1, further comprising:
   placing a control system in electrical communication with the replacement wind turbine generators and the vanadium redox battery;
   the control system monitoring total energy output from the wind turbine generators and the vanadium redox battery; and
   the control system operating the vanadium redox battery to store energy and ensure total energy output does not exceed the rating limit.

3. The method of claim 2, wherein operating the vanadium redox battery includes instructing the vanadium redox battery to absorb the difference between total energy output and the rating limit when the total energy output exceeds the rating limit.

4. The method of claim 2, wherein operating the vanadium redox battery includes instructing the vanadium redox battery to discharge the difference between total energy output and the rating limit when the rating limit exceeds the total energy output.

5. The method of claim 1, wherein the replacement wind turbine generators generate AC.

6. The method of claim 1, wherein the replacement wind turbine generators generate DC.

7. A method for retrofitting a wind power generation system that includes a wind turbine generator and a rating limit for grid interconnection, comprising:
   replacing the wind turbine generator having an original energy output that is within the rating limit with a replacement wind turbine generator having an increased energy output, wherein the increased energy output exceeds the rating limit; and
   placing a vanadium redox battery in electrical communication with the replacement wind turbine generators, the vanadium redox battery sized to absorb and store the difference between the increased energy output and the original energy output.

8. The method of claim 7, further comprising:

placing a control system in electrical communication with the replacement wind turbine generator and the vanadium redox battery;

the control system monitoring total energy output from the wind turbine generator and the vanadium redox battery; and the control system operating the vanadium redox battery to store energy and ensure total energy output does not exceed the rating limit.

9. The method of claim 8, wherein operating the vanadium redox battery includes instructing the vanadium redox battery to absorb the difference between total energy output and the rating limit when the total energy output exceeds the rating limit.

10. The method of claim 8, wherein operating the vanadium redox battery includes instructing the vanadium redox battery to discharge the difference between total energy output and the rating limit when the rating limit exceeds the total energy output.

11. The method of claim 7, wherein the replacement wind turbine generator generates AC.

12. The method of claim 7, wherein the replacement wind turbine generator generates DC.

13. A method for retrofitting a wind power generation system that includes wind turbine generators and a rating limit for grid interconnection, comprising:

replacing the wind turbine generators having an original collective energy output that is within the rating limit with replacement wind turbine generators having an increased collective energy output, wherein the increased collective energy output exceeds the rating limit;

placing a vanadium redox battery in electrical communication with the replacement wind turbine generators, the vanadium redox battery sized to absorb and store the difference between the increased collective energy output and the original collective energy output;

placing a control system in electrical communication with the replacement wind turbine generators and the vanadium redox battery;

the control system monitoring total energy output from the wind turbine generators and the vanadium redox battery;

the control system comparing the total energy output to the rating limit; and the control system operating the vanadium redox battery to ensure that total energy output does not exceed the rating limit.

14. The method of claim 13, wherein operating the vanadium redox battery includes instructing the vanadium redox battery to absorb the difference between total energy output and the rating limit when the total energy output exceeds the rating limit.

15. The method of claim 13, wherein operating the vanadium redox battery includes instructing the vanadium redox battery to discharge the difference between total energy output and the rating limit when the rating limit exceeds the total energy output.

16. The method of claim 13, wherein the replacement wind turbine generators generate AC.

17. The method of claim 13, wherein the replacement wind turbine generators generate DC.

18. A wind power generation system having a rating limit for grid interconnection, comprising:

a plurality of wind turbine generators having a collective energy output that exceeds the rating limit; and a vanadium redox battery in electrical communication with the wind turbine generators and sized to substantially store the difference between the collective energy output and the rating limit.

19. The wind power generation system of claim 18, further comprising a control system in electrical communication with the wind turbine generators and the vanadium redox battery and including, a processor, and a memory having stored thereon executable instructions for performing the method of:

monitoring total energy output from the wind turbine generators and the vanadium redox battery, comparing the total energy output to the rating limit, and operating the vanadium redox battery to ensure that total energy output does not exceed the rating limit.

20. The wind power generation system of claim 19, wherein operating the vanadium redox battery includes instructing the vanadium redox battery to absorb the difference between total energy output and the rating limit when the total energy output exceeds the rating limit.

21. The wind power generation system of claim 19, wherein operating the vanadium redox battery includes instructing the vanadium redox battery to discharge the difference between total energy output and the rating limit when the rating limit exceeds the total energy output.

22. The method of claim 19, wherein the replacement wind turbine generators generate AC.

23. The method of claim 19, wherein the replacement wind turbine generators generate DC.

* * * * *

UNITED STATES PATENT AND TRADEMARK OFFICE
CERTIFICATE OF CORRECTION

PATENT NO.         : 7,227,275 B2
APPLICATION NO. : 11/048388
DATED                 : June 5, 2007
INVENTOR(S)       : Hennessy et al.

It is certified that error appears in the above-identified patent and that said Letters Patent is hereby corrected as shown below:

Column 1, Line 24 reads, "...the power outputs from wind turbine..." which should read --...the power output from wind turbine...--

Column 3, Line 58 reads, "...a return line valves 44..." which should read --...a return line valve 44...--

Column 5, Line 7 reads, "...turbines installed in two to three decades..." which should read --...turbines installed two to three decades...--

Column 7, Line 10 reads, "...in VRB components occurs." which should read --...in VRB components occur.--

Signed and Sealed this

Fifth Day of August, 2008

JON W. DUDAS
*Director of the United States Patent and Trademark Office*